United States Patent [19]

Altschuler et al.

[11] 4,098,369

[45] Jul. 4, 1978

[54] UNDERWATER SOUND GENERATOR

[75] Inventors: Samuel Altschuler, Tarzana, Calif.; Jerre A. Hitz, Annandale, Va.

[73] Assignee: TRW Inc., Redondo Beach, Calif.

[21] Appl. No.: 644,778

[22] Filed: Dec. 29, 1975

[51] Int. Cl.$^2$ ............................................. G01V 1/06
[52] U.S. Cl. .................................... 181/118; 181/120
[58] Field of Search ............................... 181/118, 120

[56] References Cited
U.S. PATENT DOCUMENTS

| | | | |
|---|---|---|---|
| 3,332,510 | 7/1967 | Clark | 181/118 X |
| 3,588,801 | 6/1971 | Leonard | 181/118 X |

*Primary Examiner*—Stephen J. Lechert, Jr.
*Attorney, Agent, or Firm*—John J. Connors; Benjamin DeWitt; Donald R. Nyhagen

[57] ABSTRACT

A monopropellant fluid is ignited in a combustion chamber to form a pressurized gas volume which may include the interior of a piston valve opening into the combustion chamber. A first gas path leading out of the combustion chamber conducts gas to surface areas of the piston so as to exert pressure urging the piston valve closed. A second gas path leading out of the combustion chamber conducts gas to other surface areas of the piston so as to exert pressure urging the piston valve to open a plurality of radial exhaust ports which vent the gas out of the combustion chamber and thereby generate a sonic pulse. Periodic opening and closing of the piston valve causes a train of sonic pulses to be generated.

10 Claims, 1 Drawing Figure

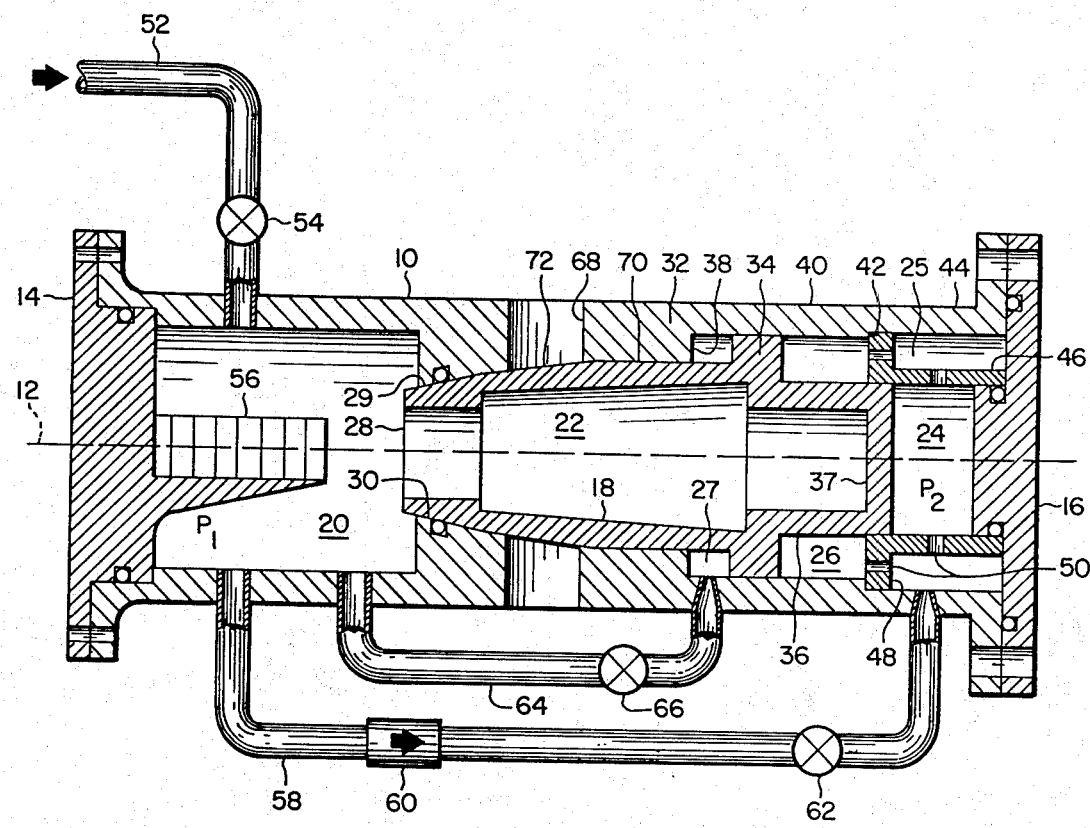

UNDERWATER SOUND GENERATOR

BACKGROUND OF THE INVENTION

This invention relates to an underwater sonic pulse generator, and particularly to apparatus utilizing a monopropellant to generate a pressurized gas volume and expel the gas in rapidly recurring short bursts through vents in the gas column to generate sonic pulses.

Seismic exploration for potential subsea oil drilling sites currently requires explosive energy sources which will acoustically penetrate the ground beneath the oceans. Returning echo patterns are recorded and contour maps are created with this data. Presently, these explosive energy releases are made by dynamite, fuel-air mixture, or compressed air. Each of these methods has certain disadvantages such as producing inefficient frequency distribution of the energy, requiring heavy and expensive support equipment, or delivering a low amount of energy per pound of fuel.

SUMMARY OF THE INVENTION

A piston valve is slidably mounted centrally within a cylindrical housing so as to divide the interior of the housing into a combustion chamber at the forward end, air spring chambers at the rear end, and a piston chamber within the interior of the piston valve communicating with the combustion chamber.

A monopropellant, such as hydrazine, when introduced into the combustion chamber and ignited, dissociates to form a gas which fills the combustion chamber and piston chamber. A first conduit conducts gas from the combustion chamber to the air spring chambers, and the gas pressure exerted on the rearwardly facing surfaces of the piston valve forces the piston valve to close off a plurality of radially extending exhaust ports.

When a second conduit is opened to conduct gas from the combustion chamber to a forwardly facing surface of the piston valve and thereby overcome the force on the rearwardly facing surfaces, the piston valve moves against the air spring chambers to vent the gas from the combustion chamber out of the exhaust ports and thereby generate a sonic pulse.

BRIEF DESCRIPTION OF THE DRAWING

The single FIGURE is a diagrammatic view partly in cross section showing a sonic pulse generator constructed according to the invention.

DESCRIPTION OF THE PREFERRED EMBODIMENT

Referring now to the drawing there is shown a sonic pulse generator including a cylindrical housing 10 extending along a central longitudinal axis 12. The housing 10 is closed at its forward end by a front closure member 14 and at its rear end by a rear closure member 16.

A hollow, cylindrical piston valve 18 is arranged within the housing 10 aligned with the central axis 12 so as to divide the interior of the housing 10 into several chambers, namely a combustion chamber 20 between the front closure member 14 and the front end of the piston valve 18, a piston chamber 22 within the interior of the piston valve 18, and air spring chambers 24, 25, and 26 between the rear end of the piston valve 18 and the rear closure member 16.

The front end or nose 28 of the piston valve 18 facing the combustion chamber 20 is open, whereby the piston chamber 22 forms a continuation of the combustion chamber 20. The tip of the piston valve 18 has a tapered outer cylindrical seating surface 29 which in the closed position of the piston valve 18 shown mates with a correspondingly tapered valve seat 30. The valve seat 30 is formed at the end of a thickened wall portion 32 in the middle of the housing 10, the thickened wall portion 32 also forming a support for the main body of the piston valve 18.

The rear portion of the piston valve 18 has a stepped outer diameter. A short distance to the rear of the thickened wall portion 32, the outer diameter of the piston valve 18 increases abruptly to a uniform maximum diameter to form a rim portion 34, the end of which terminates in a smaller diameter neck portion 36, and the latter terminating in an end wall 37 that forms the closed rear end of the piston valve 18.

The rear portion of the housing 10 has a stepped inner diameter, there being a first shoulder 38 joining the thickened wall portion 32 and a wall portion 40 of intermediate thickness, and there being another shoulder 42 joining the intermediate wall portion 40 and the terminating wall portion 44 of smallest thickness. The outer surface of the rim portion 34 of the piston valve 18 mates with the inner surface of the intermediate wall portion 40 of the housing 10.

A cylindrical sleeve 46 is supported on the shoulder 42 by a flange 48 and is closed at the end by the rear closure member 16. The outer cylindrical surface of the neck portion 36 of the piston valve 18 mates with the inner cylindrical surface of the sleeve 46. The sleeve 46 is provided with a plurality of openings 50 in its side wall and in the flange 48 so that the air spring chambers 24, 25, and 26 will exert a combustion gas pressure on the rear and the outer side of the end wall 37, which constitute the entire exterior rearwardly surfaces of the piston valve 18.

Returning now to the combustion chamber 20, it is fed a fluid stream of a monopropellant from a storage tank, not shown, through a fuel inlet line 52, and a valve 54. The monopropellant, which is preferably hydrazine or other known liquid monofuel, is directed onto a catalyst bed 56 within the combustion chamber 20. As is well known, the catalyst bed comprises granules or pellets of a suitable catalytic material which may be heated or unheated to hasten the exothermic decomposition of the monofuel into desired gases.

A first gas outlet conduit 58 leads out of the combustion chamber 20, and through a one way regulator valve 60 and valve 62 enters the air spring chamber 24, 25, and 26 through an opening in the terminating wall portion 44 of the housing 10 and the opening 50. A second gas outlet conduit 64 leads out of the combustion chamber 20, and through a solenoid valve 66 enters the annular space 27 between the shoulder 38 and the front side of the rim portion 34 through an opening in the wall portion 40.

A plurality of exhaust ports 68 are provided in the thick wall portion 32 leading into the main body of the piston valve 18. There are preferably at least four exhaust ports 68 radially spaced about the axis 12, and equiangularly spaced from each other.

The main body of the piston valve 18 has a lineal portion 70 of uniform outside diameter extending from the rim portion 34 forward to a location which, in the closed position of the piston valve 18, lies between the exhaust ports 68 and the shoulder 38. The lineal portion 70 extends forward of the shoulder 38 a distance that is greater than the lineal piston travel. In the region 72 between the piston seating surface 29 and lineal portion 70 of uniform outside diameter, the outside diameter of the piston valve 18 has a more gradual taper than the piston seating surface 29, and in that region 72 of more gradual taper, the piston valve 18 closes the exhaust ports 68. The interior surface of the thick wall portion 32 is suitably dimensioned to fit the main body of the piston valve 18.

In the operation of the sonic pulse generator, the monopropellant fluid is introduced into the combustion chamber 20 upon opening the valve 54. The monofuel is caused to strike the catalyst bed 56, whereupon it is ignited and the resulting gas quickly fills the combustion chamber 20 and the piston chamber 22, thereby creating a volume of gas therewithin of a given high pressure $P_1$.

With the valve 62 open, some of the gas is allowed to flow through the outlet path 58 and one-way regulator valve 60 into the air spring chambers 24 and 25, the regulator valve 60 operating to reduce the gas pressure to a pressure $P_2$ that is somewhat lower than the pressure $P_1$.

The lower pressure $P_2$ is exerted over the external surface area of the piston valve 18 that includes the outer face of the end wall 37 and the rear face of the rim portion 34, since the gas moves through the openings 50 to fill the entire void spaces 24, 25, and 26. The higher pressure $P_1$ is exerted on the interior of the piston valve 18 over an area whose maximum cross-sectional diameter is less than the maximum cross-sectional diameter over which the reduced pressure $P_2$ is exerted on the exterior of the piston valve 18. The factor by which the external piston area, over which the reduced pressure $P_2$ is exerted, exceeds the internal piston area, over which the higher pressure $P_1$ is exerted, is greater than the factor by which pressure $P_1$ exceeds opposing pressure $P_2$. Consequently, the force urging the piston valve 18 closed is greater than the force urging the piston valve 18 open, so there is a net force urging the piston valve 18 to the closed position and all the gas remains inside the chambers 20, 22, 24, 25, and 26.

In order to vent the volume of gas and thereby create a sonic pulse, the valve 66 is opened momentarily to allow some of the high pressure $P_1$ gas to flow into the annular space next to the front face of the rim portion 34. The resulting force exerted on the front face of the rim portion 34 is sufficient to overcome the opposing force urging the piston valve 18 closed, whereupon the piston valve 18 moves to the right, off the valve seat 30, with its movement cushioned by the gas in the air spring chambers 24 and 26 which is further compressed by the piston movement. When the valve 66 closes, the piston valve 18 remains in its open position allowing the gas to vent out of the exhaust ports 68, thereby creating the desired sonic pulse. The frequency of the sonic pulse is determined by the specific dimensions of the combustion chamber 20, the piston chamber 22 and the exhaust ports 68, as well as the gas temperature and water depth. The cyclic rate is determined primarily by the opening and closing cycle of the valve 66.

When it is desired to terminate the sonic pulse and condition the apparatus so that it can create another sonic pulse, the valve 66 is opened momentarily to vent the gas from the annular space next to the front side of the rim portion 34 and thereby remove the force holding the piston valve 18 open. The gas pressure is maintained in the air spring chamber 24, 25, and 26 because the one way regulator valve 60 prevents the gas from escaping back into the combustion chamber 20. The gas in the air spring chambers 24, 25, and 26 thus forces the piston valve 18 to close. When the valve 66 closes, pressure is allowed to build up once again in the combustion chamber 20 and piston chamber 22. Now the above described procedure can be repeated to generate the next sonic pulse.

Hydrazine is preferred for the monofuel because of its economy and easy handling characteristics, one main requirement being that it must be stored in a stainless steel container. A tank containing 1000 pounds of hydrazine will produce approximately 1800 sonic bursts during 30 hours of operation, based upon one burst per minute and 0.6 pound of hydrazine consumed per burst. Thus, for subsea oil exploration, sufficient fuel for many hours of operation can be contained in a relatively small volume.

Efficiency is enhanced by the $I_{sp}$ of the hydrazine and by the close proximity of the exhaust ports to the combustion chamber. The exhaust ports should have as large a diameter as is feasible so as to vent the gas in the shortest time possible.

Additional advantages are the simplicity inherent in the use of a monopropellant that does not require cryogenic storage, and the high human safety factor resulting from handling the fuel in its liquid form only.

What is claimed is:

1. Method of generating underwater sound pulses, comprising:
    (a) catalytically gasifying liquid monopropellant within a confined volume to produce pressurized gas; and
    (b) releasing the compressed gas underwater in a series of controlled pulses.
2. The method according to claim 1, wherein said pulses are controlled as to cyclic rate and time duration.
3. The method according to claim 1, wherein said pulses are adjustable as to sonic frequency.
4. Apparatus for generating underwater sound pulses, comprising:
    (a) means for catalytically gasifying liquid monopropellant within a confined volume to produce pressurized gas, and
    (b) means for releasing the compressed gas underwater in a series of controlled pulses.
5. Apparatus according to claim 4 wherein the means in (b) are susceptible of adjustment to alter the cyclic rate of the sound pulses.
6. Apparatus according to claim 4, wherein the means in (a) and (b) are susceptible of adjustment to alter the sonic frequency of the sound pulses.
7. Apparatus according to claim 4, wherein the means in (a) includes a combustion chamber.
8. Apparatus according to claim 7, wherein the means in (b) includes
    (1) means forming a plurality of exhaust ports adjacent to said combustion chamber, and
    (2) a piston valve mounted between said combustion chamber and exhaust ports for opening and closing a path therebetween.
9. Apparatus according to claim 8, and further including means forming an air spring chamber at the rear of said piston for cushioning the movement thereof to its open position.
10. Apparatus according to claim 8 wherein said piston is hollow and is mounted to form an extension of said combustion chamber, whereby the dimensions of said combustion chamber, said piston and said exhaust ports are at least in part determinative of the frequency of said sound pulses.

* * * * *